United States Patent [19]
Banaszak Holl et al.

[11] Patent Number: 5,858,544
[45] Date of Patent: Jan. 12, 1999

[54] SPHEROSILOXANE COATINGS

[76] Inventors: Mark M. Banaszak Holl, 619 Linda Vista, Ann Arbor, Mich. 48103; Clyde L. Briant, III, 9 Wedgewood La., Barrington, R.I. 02806; Sunghee Lee, 3 Thomas Olney Common, Providence, R.I. 02904

[21] Appl. No.: 573,284

[22] Filed: Dec. 15, 1995

[51] Int. Cl.⁶ ...................................... B32B 9/04
[52] U.S. Cl. ............................ 428/447; 428/450; 528/31
[58] Field of Search ..................... 428/447, 450; 528/31

[56] References Cited

U.S. PATENT DOCUMENTS

| | | | |
|---|---|---|---|
| 3,000,858 | 9/1961 | Brown et al. ........................ | 525/477 |
| 3,294,737 | 12/1966 | Krantz . | |
| 3,615,272 | 10/1971 | Collins et al. . | |
| 4,122,055 | 10/1978 | Tugukuni et al. . | |
| 4,349,609 | 9/1982 | Takeda et al. ........................ | 428/429 |
| 4,564,557 | 1/1986 | Ohgushi et al. . | |
| 4,808,653 | 2/1989 | Haluska et al. ........................ | 524/398 |
| 5,085,893 | 2/1992 | Weiss et al. .............................. | 427/387 |
| 5,106,604 | 4/1992 | Agaskar .................................. | 423/325 |
| 5,118,530 | 6/1992 | Hanneman ............................... | 427/226 |
| 5,183,684 | 2/1993 | Carpenter ................................ | 427/574 |
| 5,247,043 | 9/1993 | Nakashima ............................... | 528/14 |
| 5,279,661 | 1/1994 | Gentle ................................. | 106/287.1 |
| 5,310,583 | 5/1994 | Eckstein et al. ........................ | 427/575 |
| 5,372,842 | 12/1994 | Mine et al. ........................... | 427/126.2 |
| 5,380,555 | 1/1995 | Mine et al. .............................. | 427/226 |
| 5,380,567 | 1/1995 | Haluska .................................. | 427/578 |
| 5,589,562 | 12/1996 | Lichtenhan et al. ........................ | 528/9 |

OTHER PUBLICATIONS

Agaskar, P.A., "New Synthetic Route to the Hydridospherosiloxanes" *Inorg. Chem.* 1991, pp. 2707–2708.

*Primary Examiner*—Melvyn I. Marquis
*Attorney, Agent, or Firm*—Harness, Dickey & Pierce, P.L.C.

[57] ABSTRACT

The present invention relates to coating compositions, systems and methods for coating substrates and, more particularly, metallic substrates with spherosiloxane based coating compositions. The spherosiloxane based compositions are applied utilizing conventional techniques such as chemical vapor deposition such that upon application, the spherosiloxane molecules bond with available oxide molecules provided along the substrate.

15 Claims, 8 Drawing Sheets

SPHEROSILOXANE COATINGS

BACKGROUND AND SUMMARY OF THE INVENTION

The present invention relates to coating compositions and systems, and more particularly, to spherosiloxane based coating compositions which are particularly useful for metallic surfaces, and methods of making and using the same.

Coatings for surfaces and, more particularly, metallic surfaces such as iron, aluminum, copper and stainless steel have been employed for years with the intention of providing such surfaces with enhanced protection against degradation and/or with aesthetical appeal. However, of the coatings which are known, many have been found to insufficiently bond to the desired metal substrate, especially under long term applications. Further, many of the coatings which are known often fail to endure post treatment processing of the surface such as those imparted during bending and shaping of the coated metal surface.

Still another perceived problem with many of the known coatings which are available and employed to coat metallic surfaces is that they fail to sufficiently protect the surface from contamination and corrosion.

Certain silicon based coatings, such as those disclosed in U.S. Pat. No. 4,714,632 by Cabrera et al., based on amorphous silicon dioxide are known to offer relatively good adhesion when applied as a diffusion coating to steel surfaces. However, it was noted that the porosity of amorphous $SiO_2$ hampers the film's effectiveness for purposes of corrosion inhibition. Water and water soluble ions, which catalyze corrosion, are able to penetrate through the hydrophilic amorphous $SiO_2$ framework, thus making the coated surface susceptible to corrosion.

It is, therefore, an object of the present invention to provide coating compositions which inhibit corrosion of the article which is coated.

It is another object of the present invention to provide a coating compositions which readily adhere to the surface to be coated.

Still another object of the present invention is to provide coating compositions which are substantially hydrophobic in nature.

It is yet another object of the present invention to provide coating compositions which are acid stable, and therefor resistant to chemical degradation.

Yet another object of the present invention is to provide coating compositions which can be functionalized, thereby allowing them to be used as a primer layer in conjunction with conventional coating technologies.

The composition and methods of the present invention preferably employ:

a spherosiloxane composition including silicon atoms which are capable of bonding with available oxygen atoms provided along the surface of the substrate to be coated.

BRIEF DESCRIPTION OF THE DRAWINGS

Other objects and advantages of the invention will become apparent upon reading the following detailed description and upon references to the drawings in which.

DETAILED DESCRIPTION OF THE PRESENT INVENTION

The present invention comprises coating compositions or systems useful in coating surfaces including oxide containing groups. The compositions are particularly useful in coating metallic surfaces.

The coatings preferably comprise a spherosiloxane composition including silicon atoms which bond with available oxygen atoms of said oxide to form a coating. Preferably, the coatings will be essentially free of hydrocarbons which tend to interfere with the bonding reaction between the coating composition and the surface to be coated. Additionally, the coating composition will preferably be hydrophobic in nature.

The coatings provided by the compositions and methods of the present invention may be decorative, protective or act as a base or primer layer for another coating or treatment step.

The coatings may be applied or deposited using various conventional application techniques, but preferably will be applied by a technique known in the art as chemical vapor deposition.

The term "spherosiloxane" as used herein is generally intended to mean molecules consisting of silicon atoms single bonded to an oxygen atom and arranged in a molecular configuration such that each silicon atom is linked with three oxygen atoms. The empirical formula for the spherosiloxane molecules as used herein in $HSiO_{1.5}$. Specific examples of spherosiloxane molecules employed in the coatings of the present invention include (a) $H_8 Si_8 O_{12}$; (b) $H_{10} Si_{10} O_{15}$; (c) $H_{12} Si_{12} O_{18}$; and (d) $H_{14} Si_{14} O_{21}$, among others.

The present invention comprises coating compositions or systems useful in coating substrates or surfaces which have available oxygen atoms to which silicon atoms of the spherosiloxane molecules contained in the coating composition can bond. The coating composition can be applied directly to a substrate surface or may be applied to a surface which has been chemically or physically pretreated.

The compositions can particularly be used to coat various metallic surfaces having free oxygen groups contained along the exposed surface thereof. Further, the compositions of the present invention upon application and curing, make the resulting coated surface hydrophobic in nature which, in turn, assists in corrosion resistance. In addition, the highly preferred compositions of the present invention will be highly acid stable.

The coatings provided by the compositions and methods of the present invention may, in addition to serving as a decorative and/or protective coatings, serve as a base, otherwise referred to herein as a primer layer, for application of another coating or treatment. The coatings may be applied or deposited on the desired substrate surface utilizing any one of a number of conventional techniques, such as spraying, dipping or role coating, depending upon the geometry of the object to be coated but, most preferably will be applied utilizing chemical vapor deposition.

While the coating compositions and systems described herein are generally considered to be useful for coating a wide variety of surfaces which include available oxygen atoms, the invention will hereinafter be described with reference to coating compositions and systems for coating oxidized metallic substrates including, but not limited to aluminum, chromium, cobalt, copper, iron, hafnium, manganese, molybdenum, niobium, tantalum, titanium, tungsten, vanadium, zirconium and alloys thereof, among others. For exemplary purposes, the invention will particularly be described in terms of coating stainless steel surfaces.

By way of background, stainless steel, as obtained from suppliers, is typically covered by a thin layer of organic material including contaminants such as dirt, films and greases. Unless the contaminants are removed, however, such materials tend to interfere with the chemical reactions involved in adhering coating compositions to the substrate generally. Thus, decontamination and activation of the steel surface is typically required in order to coat the desired surface.

Figure 1:
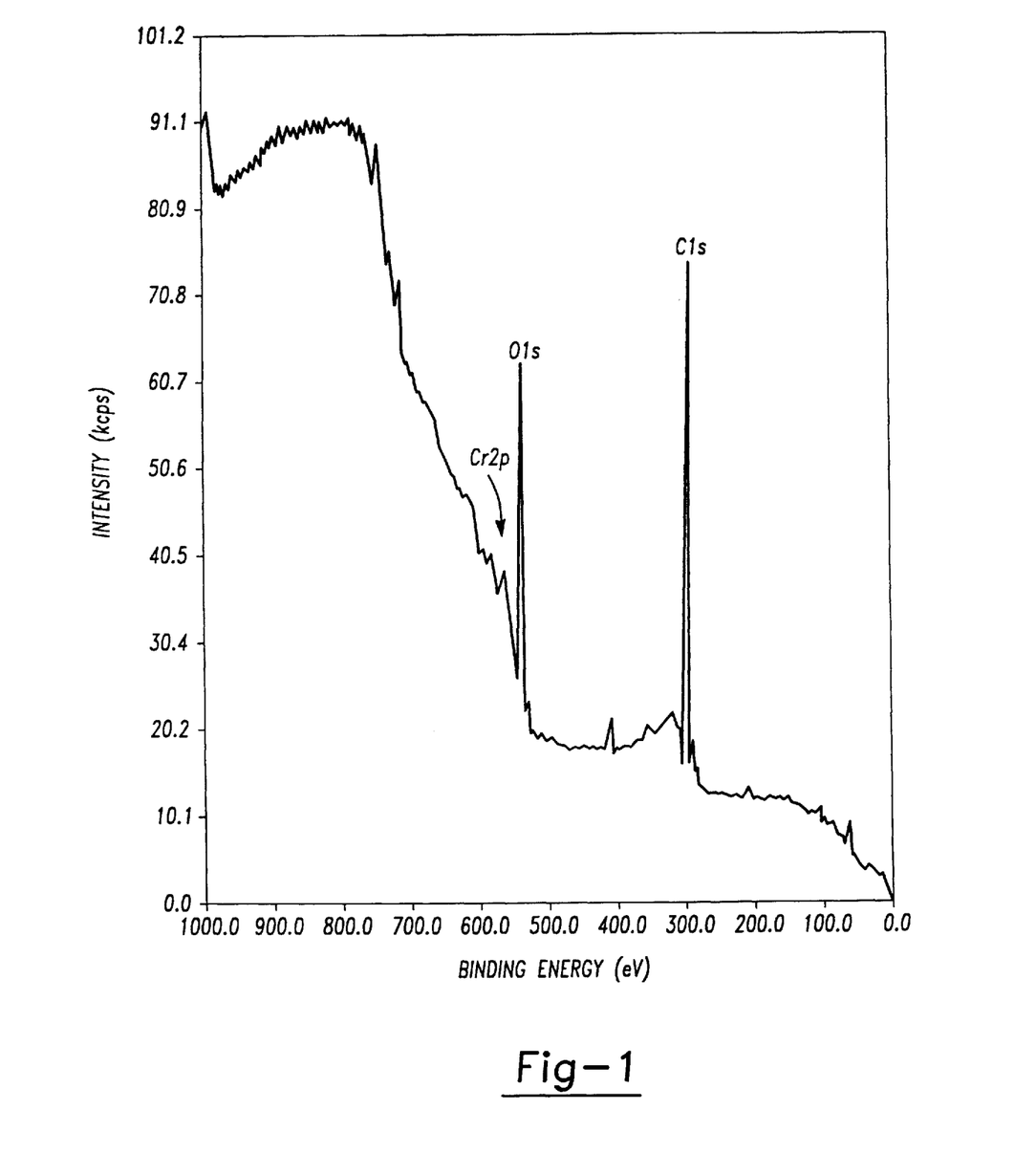
FIG. 1 is an illustration of a X-ray Photoemission Spectroscopy spectrum for an untreated stainless steel surface.

To prepare a metallic surface and, more particularly, a stainless steel surface for coating, the surface should be washed with a suitable solvent such as ethanol to remove loose contaminants. As illustrated in FIG. 1, an X-ray photoemission spectroscopy spectrum of a 304 stainless steel sample is provided which indicates the state of the surface upon cleaning by sonication in ethanol to remove certain impurities. However, as evidenced by the strong C1s core level, a significant amount of carbon impurities remain on the surface. Thus, an additional pretreatment step is generally required to obtain the optimum bonding between the compositions of the present invention and the desired substrate.

As a second step, the steel sample is heated to approximately 560° C. under $1 \times 10^{-5}$ torr in the presence of oxygen gas for five minutes to both oxidize away carbon impurities remaining along the surface to be coated and to promote the growth of chromium oxide along the surface.

Upon heating the steel sample, the increased mobility for chromium, manganese and iron atoms in particular results in additional chromium approaching the surface where it is subsequently oxidized by the $O_2$ gas. Not only are hydrocarbons burned off thereby increasing the apparent intensity of all metal species, but also the concentration of chromium is increased along the surface as chromium ions remain concentrated along or near the surface as the surface cools and the ions become less mobile. Thus, upon heating stainless steel as indicated, the stainless steel becomes configured so as to include a core layer and a layer including a concentration of chromium oxide.

Figure 2:
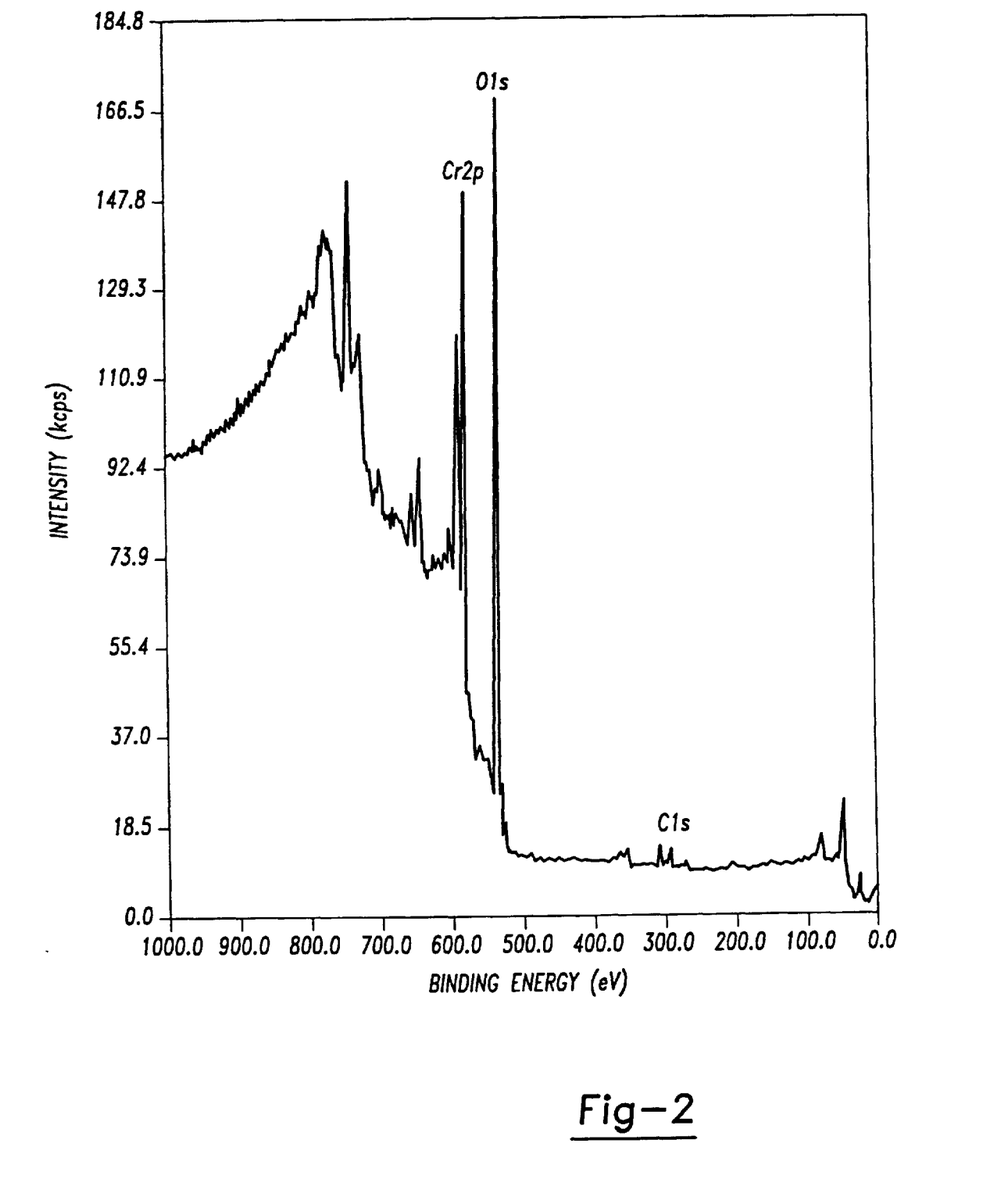
FIG. 2 is an illustration of a X-ray Photoemission Spectroscopy spectrum for a pretreated stainless steel surface.

As illustrated in FIG. 2, a significant decrease in the intensity of the C 1s core level is demonstrated which is indicative of the removal of carbon from the surface of the 304 stainless steel. Further, the significant increase in the intensity of both the Cr 2p and O1s core levels is indicative of the formation of chromium oxide along the surface.

It should be noted that while heating in the presence of oxygen gas has to date, been found to be the most effective way of enhancing chromium oxide growth, it is contemplated that other gases including oxygen as a constituent may also be employed. More particularly, activation in the presence of steam is considered to be a practical alternative.

Figure 3:
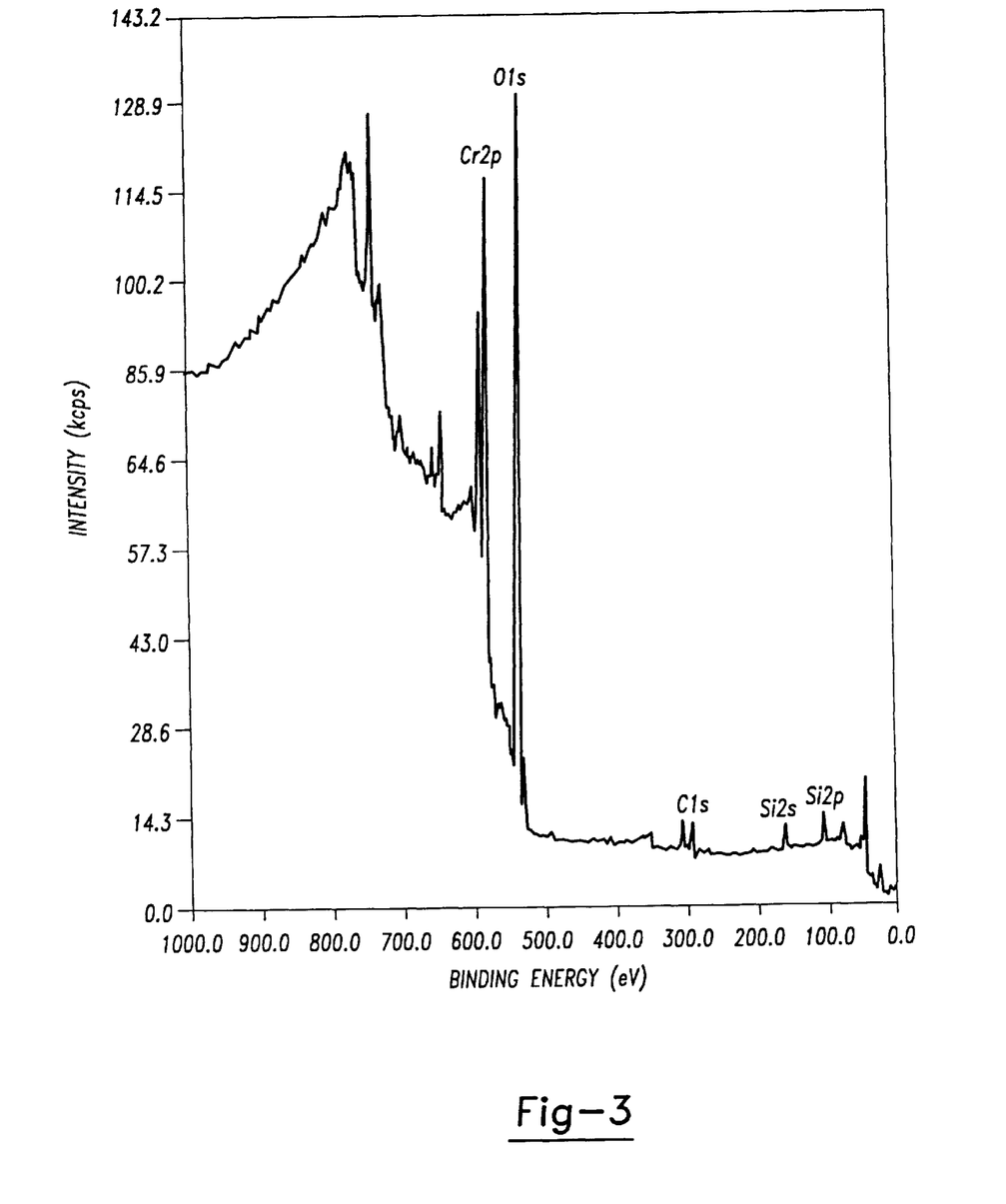
FIG. 3 is an illustration of an X-ray Photoemission Spectroscopy spectrum for a stainless steel surface coated with a composition of the present invention.

Upon treating the stainless steel surface as described above, the surface was subsequently treated with spherosiloxane clusters under vacuum at approximately $5 \times 10^{-7}$ torr utilizing chemical vapor deposition techniques for approximately 20 minutes which resulted in a significant amount of the clusters bonding to the surface as illustrated in FIG. 3 to form a coating layer. As used herein and unless otherwise specified, the phrase "spherosiloxane cluster" is intended to mean covalently bonded spherosiloxane molecules having the general empirical formula of $(HSiO_{1.5})n$ wherein n is an even integer greater than eight. To prepare spherosiloxane clusters useful in accordance with the teachings of the present invention, reference can be made to U.S. Pat. No. 5,106,604 which issued Apr. 21, 1992, to Agaskar, which is hereby expressly incorporated by reference. It should be noted that while substantially pure spherosiloxane was employed herein for testing purposes, it is contemplated that commercially available spherosiloxane compositions including, for example, silsesquixoxane resin mixtures, containing $H_8Si_8O_{12}$ (T8) or other spherosiloxanes, which is available from Dow Corning of Midland, Mich., would also be useful. Further, while the spherosiloxane molecules are preferably applied in clusters, over time the clusters may be subject to structural change which does not appear to affect the coating effectiveness.

Figure 4:
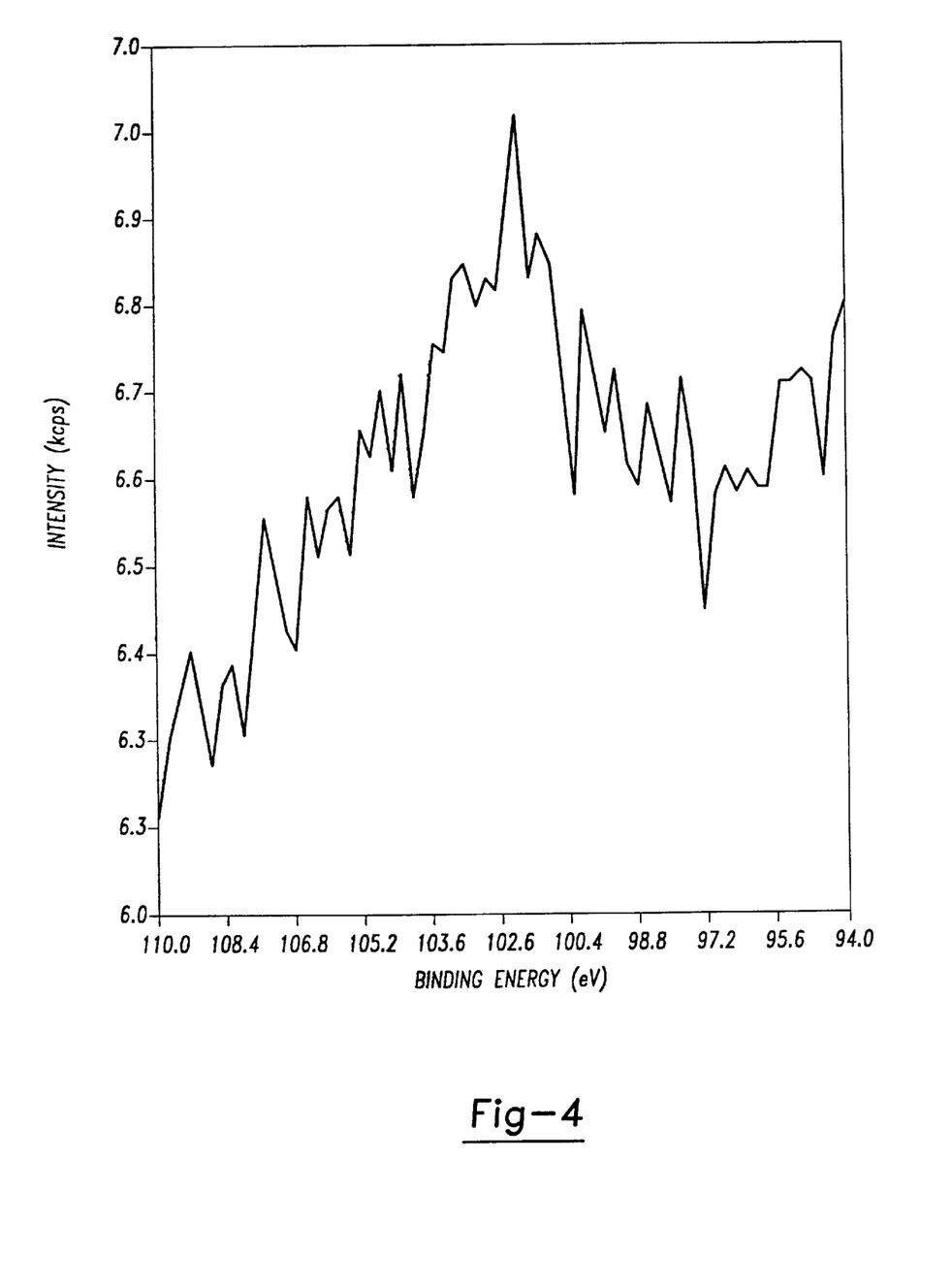
FIG. 4 is an illustration of an X-ray Photoemission Spectroscopy spectrum for a pretreated stainless steel surface along the Si 2p region.

The appearance of both Si 2p and Si 2s core levels at 104 and 155 eV, respectively, are indicative of the reaction. In addition, a new O 1s core level deriving from the spherosiloxane clusters is also present. Referring to FIG. 4, a close-up spectra of the Si 2p region, before exposure to the spherosiloxane clusters as described above is shown, and referring to FIG. 5, a close-up spectra of the Si 2p region after exposure is illustrated. Additionally, a close-up spectra of the O1s region before exposure to the spherosiloxane clusters is shown in FIG. 6 and after exposure in FIG. 7.

Figure 5:
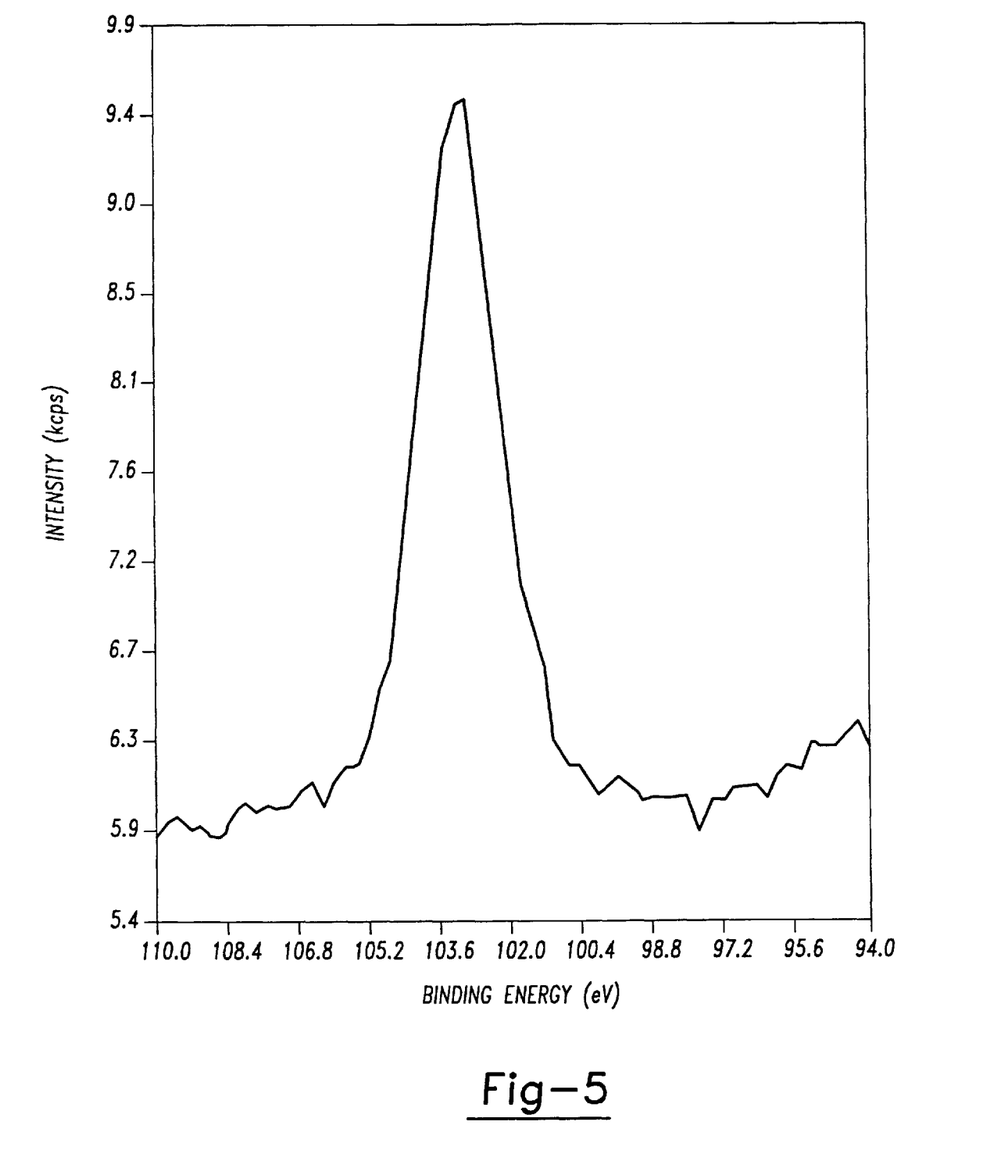
FIG. 5 is an illustration of an X-ray Photoemission Spectroscopy spectrum for the stainless steel surface of FIG. 4 along the Si 2p region after treatment with a coating composition of the present invention.
Figure 6:
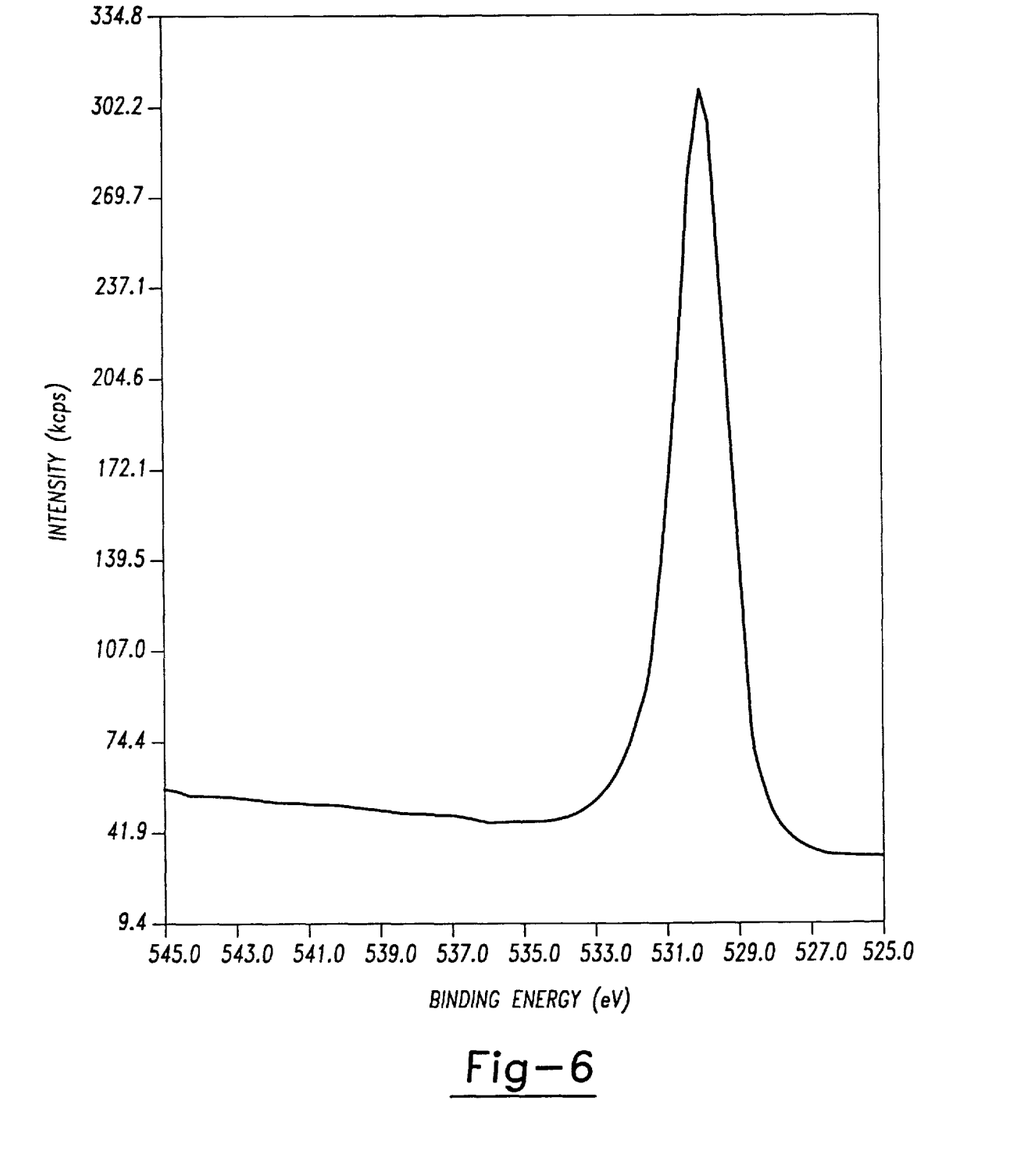
FIG. 6 is an illustration of an X-ray Photoemission Spectroscopy spectrum for a pretreated stainless steel surface along the O1s region.
Figure 7:
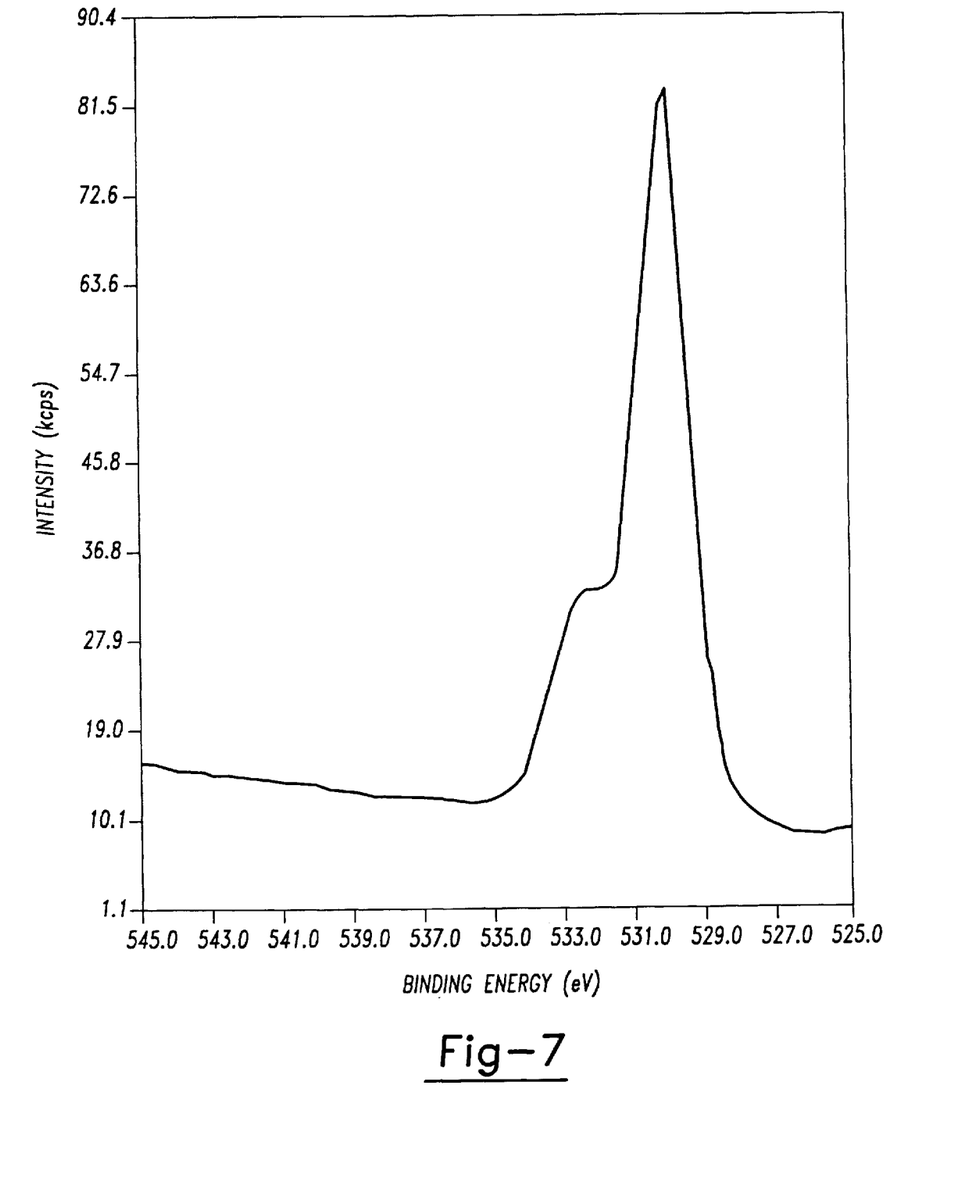
FIG. 7 is an illustration of an X-ray Photoemission Spectroscopy spectrum for the stainless steel surface of FIG. 6 along the O1s region after treatment with a coating composition of the present invention.

As indicated in FIGS. 5 and 7, the spectra demonstrate that the binding mode of the clusters to the surface of the 304 stainless steels is by way of an oxygen linkage to each cluster vertex. More particularly, the observed spectra are consistent with one or more of the silicon-hydrogen (Si—H) groups of the spherosiloxane molecules undergoing an addition reaction with a chromium oxo group.

X-ray Photoemission Spectroscopy demonstrates that when spherosiloxane clusters are bonded to chromium metal, Si2p core levels are present at approximately 103.7 and 99.8 eV, thus leading one skilled in the art to reject binding to surface chromium atoms. As previously noted, the Si—O bond provides extensive adhesion to the stainless steel surface. In this regard, Si—O bonds average approximately 452 kJ/mol as compared to carbon based systems which have an average bond strength of 360 kJ/mol for the C—O bond.

In addition to the excellent bond strength offered by the compositions of the present invention, another advantage of the present invention lies in the fact that while hydrocarbon layers are susceptible to oxidation and the formation of $CO_2$, the spherosiloxane based compositions of the present invention are comparatively oxidation resistant.

Upon determining that the coating compositions of the present invention offered strong bonding capacity with metal oxide surfaces, attention was focused on the composition's ability to impart corrosion resistance properties to such surfaces. Unlike amorphous $SiO_2$, because of the unique molecular structure and relatively small size of spherosiloxane clusters, spherosiloxane based compositions theoretically should prevent the diffusion of ions through the oxide layer.

Additionally, although coatings formed from spherosiloxane based compositions tend to have microscopic cracks between clusters providing potential sites for the diffusion of water and ions, the hydrophobic nature of the coating compositions (i.e. spherosiloxane molecules) make entry of water and ions energetically unfavorable.

To study the effects of corrosion behavior on metallic articles coated in accordance with the teachings of the present invention, 304 stainless steel samples were prepared and analyzed using ASTM practice A262-E (modified Strauss) which accelerates intergranular corrosion in stainless steels.

To conduct the corrosion analysis, three sets of 304 stainless steel samples were first sensitized by annealing for one hour at 1000° C. and then heating to 650° C. for 24 hours in a sealed quartz tube to diminish the chromium concentration in the vicinity of the grain boundaries by the precipitation of chromium carbide, thus making the steel more susceptible to corrosive environments. One set of the stainless steel samples (i.e. Sample A) was set aside, a second set of the stainless steel samples (Sample B) were then oxidized and another set (Sample C) were oxidized followed by chemical vapor deposition with $H_8Si_8O_{12}$ clusters. Corrosion tests were then run on each of the three sample sets under ASTM practice A262-E.

Figure 8A:
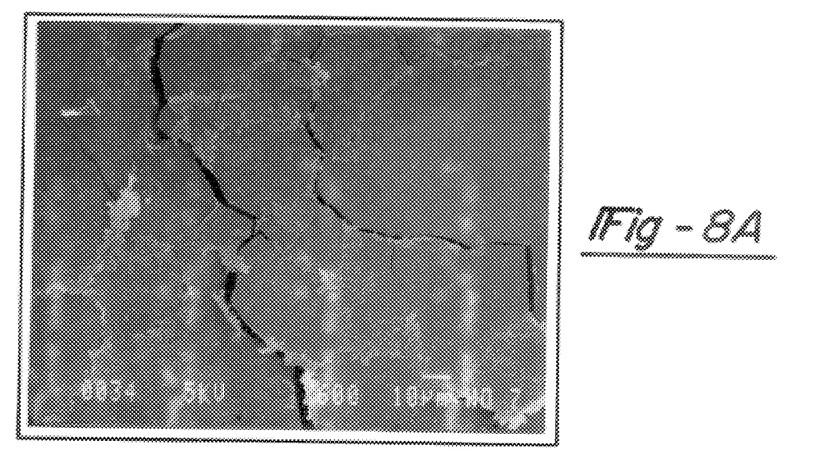
FIG. 8 is an illustration of micrographs comparing a sensitized stainless steel sample, a sensitized and oxidized stainless steel sample and a stainless steel sample which was sensitized, oxidized and thereafter treated with a $H_8Si_8O_{12}$ based coating composition in accordance with the teachings of the present invention.
Figure 8B:
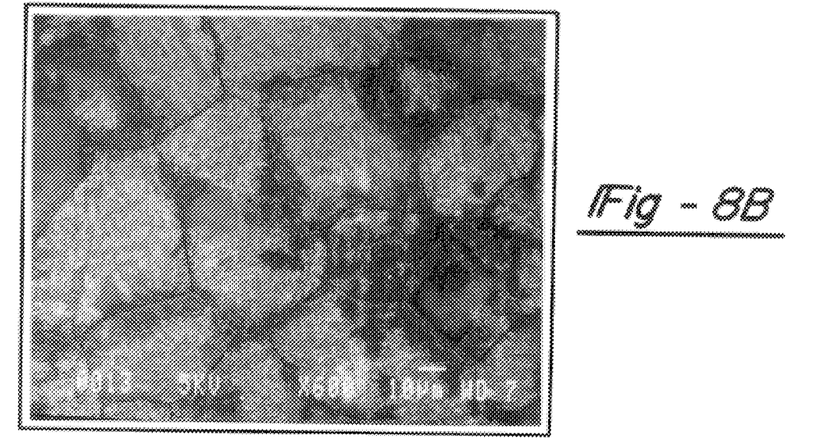
Figure 8C:
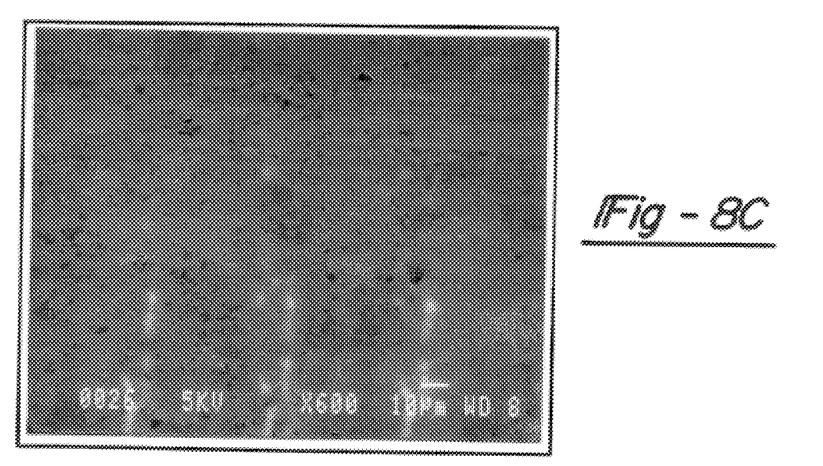

Under A262-E, each sample was wrapped in copper wire and boiled in a solution containing sulfuric acid, copper sulfate and copper shot for ten hours. A scanning electron microscope was then used to characterize the condition of each sample's surface. As illustrated with reference to the micrographs set forth in FIG. 8, Sample A, which was merely sensitized, showed both severe corrosion and extensive cracking. Sample B which involved oxidative activation which generated a chromium oxide film were somewhat more resistant to corrosive attack than Sample A, but still demonstrated cracking and showed penetration of the grain boundaries. Conversely, Sample C which was sensitized and oxidized, and thereafter coated with an $H_8Si_8O_{12}$ film having an average thickness of approximately 10 Å showed no signs of corrosion and further, no penetration of the grain boundary. Thus, the results imply that the clusters form a tightly packed film on the surface and, further, that any cracks occurring between the individual clusters are either sufficiently small and/or hydrophobic in nature to prevent corrosive attacks from occurring between such clusters. Similar results were obtained using ASTM practice 262-C.

It is important to note that while the coatings used to analyze for corrosion resistance had an average thickness of approximately 10 Å, spherosiloxane based coatings can be deposited at a rate of approximately 50 Å per minute at 500° C. in an oxygen atmosphere to yield a protective film. Theoretically then, by carefully controlling the temperature at which the spherosiloxane clusters are deposited, it should be possible to avoid eliminating all of the Si—H features of the bulk film, thus enhancing the hydrophobic nature of the coating composition. Further, hydrophobic films ranging from tens to thousands of angstroms in thickness can be used to completely seal a stainless steel surface, if desirable. For example, where the substrate is to be employed in environments where erosion is a particular concern, thicker layers of the coating compositions may be desirable.

In addition to utilizing the spherosiloxane based compositions as coatings for metal oxide based surfaces, the coating compositions of the present invention are contemplated as being applicable as primer layers useful in conjunction with conventional coating technologies. In this regard, it is possible to replace one or more of the Si—H groups with a wide variety of ligands such that the layer can be designed to cross-link with epoxy or urethane based coating compositions, for example. To gain a further understanding of the functionalization of the spherosiloxane molecules, reference can be made to the article by Lichtenhan, J., *Comments in Org. Chem.*, 1995, 17:115–130, such article being expressly incorporated herein by reference.

As noted in the article by Lichtenhan, recent activity in the field of polymerizable inorganic spherosiloxane clusters has been directed primarily toward the application of POSS compounds in catalysis, as nonchelating ligands, as precursors to silica surfaces and interfaces, as precursors to silicates, and as polymerizable reagents for example.

By definition, polyhedral oligomeric silsesquioxanes (POSS) are compounds with the generic formula $(RSiO_{1.5})_n$ where R=various hydrocarbons and n=6, 8, 10, or higher. The silicon-oxygen framework in POSS molecules generally contains multiple ring structures in which each silicon atom is bound to one organic group and three oxygen atoms to form a fully condensed polycyclic structure. Examples of fully condensed POSS systems are shown below:

$R_6T_6$

$R_8T_8$ $R_{10}T_{10}$

In general fully condensed POSS systems contain equivalent organic groups on each silicon atom, rendering them either completely functionalized with nonreactive groups, such as the cyclohexyls in $Cy_8T_8$, or fully functionalized with reactive groups, such as the hydrides in the case of $H_8T_8$.

POSS systems containing incompletely condensed silicon-oxygen frameworks are also known; however, they are rarer by comparison. In addition to containing equivalent organic functionalities on each silicon atom making up the POSS silicon-oxygen framework, the incompletely condensed frameworks also contain reactive silanol functionalities. The reactivity of the silanol groups makes the incompletely condensed POSS systems of interest as models for silica supported catalysis and as precursors to new families of graftable or polymerizable macromers that are useful as polymer additives and for the preparation of linear POSS-based polymeric systems. Examples of incompletely condensed POSS systems are shown below:

$R_8T_6D_2(OH)_2$

$R_7T_4D_3(OH)_3$ $R_8T_2D_4(OH)_4$ $R_4D_4(OH)_4$

Synthetic methods which afford the preparation and isolation of both completely and incompletely condensed POSS molecules rely upon the manipulation of a variety of empirical reaction variables. The ability to selectively and rationally prepare POSS systems in a manner that affords strict control over their structure, functionality, and yield is still beyond the capability of current synthetic inorganic chemistry. For example, synthetically useful quantities of fully condensed hydride functionalized compounds (such as $H_8T_8$, $H_{10}T_{10}$) and incompletely condensed POSS compounds (such as $(c\text{-}C_6H_{11})_7T_4D_3(OH)_3$ and $(c\text{-}C_6H_{11})_8T_6D_2(OH)_2$) are produced in variable yields and require isolation from complex product mixtures that result from the batch hydrolysis of alkyl trichlorosilanes. Subsequent isolation and purification steps are also required, which further extends what may already be a lengthy production process.

Secondary manipulations of the structure and functionality of POSS systems are also limited. Only transformations of groups attached to the silicon atoms within fully condensed POSS frameworks have been reported. These have primarily involved standard organic manipulations such as hydrogenation, chlorination, hydrosilation, esterification, acylation, epoxidation, etc. These transformations generally occur in high yield and with retention of the POSS structure (see Eqs. (1) and (2) below). Selective framework manipulations in fully condensed POSS systems have not yet been reported.

Investigations into the chemistry of incompletely condensed POSS systems have focused on reactions of the silanol groups. Toward the synthesis of new classes of polymerizable monomers, the goat of this chemistry has been to reduce the polysilanol functionality of these systems to one or two. POSS molecules with only one or two reactive functionalities are desirable for the preparation of linear POSS-based polymers and hybrid materials.

The trisilanol functionality of the $R_7T_4D_3(OH)_3$ structure shown above can be fully or partially reduced through stoichiometric reactions with silanes such as $XSiMe_3$ where $X=Cl$, $NMe_2$ (see Eq. (3) below). Reactions of $R_7T_4D_3(OH)_3$ with bases capable of forming stabilized heterosiloxide bonds can promote shrinkage of POSS frameworks while also reducing the number of silanol groups (see Eq. (4) below).

POSS-α-epoxide after treatment with m-chloro-perbenzoic acid (mcpba) (see Eq. 6 below).

(6)

The corner capping reaction appears to be the most general and synthetically useful chemical manipulation of the silicon-oxygen framework for this incompletely condensed POSS structure. The isolated yields from these Alternatively, a method for controlling functionality and for manipulation of the siliconoxygen framework involves corner capping POSS trisilanols with various silane coupling agents to produce fully condensed $T_8$ POSS compounds (see Eq. 5 below).

Through variation of the Y group on the silane, a variety of functionalities can be placed off the corner of the POSS framework (see Table I). Subsequent transformations of this group can be carried out until the desired functionality has been obtained. An example of such a modification is shown below and involves the conversion of a POSS-olefin into a corner capping reactions average around 90% or greater when moisture is excluded from the system.

TABLE I

Partial listing of POSS $R_7T_8Y$ molecules and reactive functionalities.

| $R_7T_8Y$ | Y Functionalities | |
|---|---|---|
| | silanol | halide |
| | silane | alcohol |
| | acrylic | amine |
| | olefin | isocyanate |
| | epoxide | acid/acid chloride |
| R = c-$C_7H_{13}$ c-$C_6H_{11}$ c-$C_5H_9$ | | |

Improvements in the synthetic methods currently used for the preparation of POSS systems are necessary before the commercial development of these macromers and polymers can be realized. Development of synthetic routes to related polyhedral building blocks (ideally based on metallic oxides, carbides, or nitrides) are of additional interest as potential new classes of polymerizable macromers.

When appropriately functionalized, POSS molecules can be used as conventional organic monomers in copolymerizations to diversify the properties of conventional hydrocarbons. Additionally, the solubility and melt processability of polymeric POSS systems enable them to be blended with polymeric hydrocarbons as well as other inorganic polymers. This offers exciting prospects for property modification of numerous families of hydrocarbon polymers.

Theoretically, the spherosiloxane clusters would serve to anchor an organic coating to the surface of the stainless steel.

Importantly, the spherosiloxane clusters should react extensively at the grain boundary regions, thus binding the organic coating especially tightly at the most corrosion susceptible areas of the surface. Further, since many commercially available coating technologies function by slowing the rate of ion diffusion through the surface, use of the spherosiloxane based coating composition as a primer layer should help reduce the permeativity of the entire coating system to water and, consequently, to chloride ions.

An added feature of the present invention is that the spherosiloxane derived films change the surface tribology. Normally, oxide films on metal are hydrophilic, meaning they readily form hydrogen bonds to water and other substances. However, the spherosiloxane based films are hydrophobic, meaning they do not form strong hydrogen bonds to water or other hydrogen-bonding solvents or materials. This should result in a lower frictional force in media that are aqueous in nature such as water itself, or items which have water as a major component such as living tissues (cells, skin, etc.).

The invention has been described in an illustrative manner, and it is to be understood that the terminology which has been used is intended to describe the invention in a non-limiting manner. The invention as described therefore constitutes the preferred embodiments of the present invention, and it should be appreciated that the invention is susceptible to modification, variation and change without departing from the proper scope and fair meaning of the accompanying claims.

What is claimed is:

1. An article comprising:
   a) a first layer having a surface which includes a metal oxide having oxygen atoms available for bonding; and
   b) a second layer in contact with at least a portion of said first layer, said second layer including spherosiloxane molecules having silicon atoms which covalently bond with said oxygen atoms of said metal oxide to form a hydrophobic coating.

2. The article of claim 1, wherein said metal oxide includes metal atoms selected from the group consisting of aluminum, chromium, cobalt, copper, iron, hafnium, manganese, molybdenum, nickel, niobium, tantalum, titanium, tungsten, vanadium, zirconium and mixtures thereof.

3. The article of claim 1, wherein said second layer makes said article resistant to corrosion.

4. The article of claim 1, wherein said second layer has an average thickness of at least about 10 Å.

5. The article of claim 1, wherein said second layer includes one or more ligands.

6. An article comprising:
   (a) a first layer which includes metal oxide having oxygen atoms available for bonding and is substantially free of hydrocarbon compounds; and
   (b) a second layer in contact with at least a portion of said first layer, said second layer being hydrophobic in nature and having a base unit structure comprised of spherosiloxane molecules having the empirical formula of $HSiO_{1.5}$ including silicon atoms which form covalent bonds with said oxygen atoms of said metal oxide.

7. The article of claim 6, wherein said metal oxide includes metal atoms selected from the group consisting of aluminum, chromium, cobalt, copper, iron, hafnium, manganese, molybdenum, nickel, niobum tantalum, titanium, tungsten, vanadium, zirconium and mixtures thereof.

8. The article of claim 6, wherein said second layer makes said first layer resistant to corrosion.

9. The article of claim 6, wherein said second layer has an average thickness of at least about 10 Å.

10. The article of claim 6, wherein said second layer includes one or more ligands selected from the group consisting of silanols, silanes, acrylics, olefins, epoxides, halides, alcohols, amines, isocyanates, acids, acid chlorides, and mixtures thereof.

11. A coated article comprising:
    (a) a first metallic layer including a surface having a plurality of grain boundaries, said grain boundaries including a concentration of metal oxide having oxygen atoms available for bonding; and
    (b) a second layer contacting said first layer at least along said grain boundaries, said second layer including spherosiloxane molecules having silicon atoms which covalently bond with said oxygen atoms of said metal oxide to form a hydrophobic coating.

12. The coated article of claim 11, wherein said metal oxide includes metal atoms selected from the group consisting of aluminum, chromium, cobalt, copper, iron, hafnium, manganese, molybdenum, nickel, niobium, tantalum, titanium, tungsten, vanadium, zirconium and mixtures thereof.

13. The coated article of claim 11, wherein said second layer makes said first layer resistant to corrosion.

14. The coated article of claim 11, wherein said second layer has an average thickness of at least about 10 Å.

15. The coated article of claim 11, wherein said second layer includes one or more ligands selected from the group consisting of silanols, silanes, acrylics, olefins, epoxides, halides, alcohols, amines, isocyanates, acids, acid chlorides, and mixtures thereof.

* * * * *

UNITED STATES PATENT AND TRADEMARK OFFICE
CERTIFICATE OF CORRECTION

PATENT NO. : 5,858,544
DATED : January 12, 1999
INVENTOR(S) : Banaszak Hall et al.

It is certified that error appears in the above-identified patent and that said Letters Patent is hereby corrected as shown below:

ON THE TITLE PAGE, after Inventors, please insert:

--Assignees: The Regents of the University of Michigan and Brown University Research Foundation--

Signed and Sealed this

Ninth Day of November, 1999

Attest:

Q. TODD DICKINSON

*Attesting Officer*  *Acting Commissioner of Patents and Trademarks*